(12) United States Patent
Hatanaka et al.

(10) Patent No.: US 9,694,694 B2
(45) Date of Patent: Jul. 4, 2017

(54) IN-VEHICLE STEP-DOWN SWITCHING POWER SUPPLY, IN-VEHICLE ELECTRONIC CONTROL DEVICE, AND IDLE STOP SYSTEM

(71) Applicant: Hitachi Automotive Systems, Ltd., Hitachinaka-shi, Ibaraki (JP)

(72) Inventors: Ayumu Hatanaka, Tokyo (JP); Takuya Mayuzumi, Hitachinaka (JP); Chihiro Sato, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 346 days.

(21) Appl. No.: 14/377,715

(22) PCT Filed: Jan. 21, 2013

(86) PCT No.: PCT/JP2013/051028
§ 371 (c)(1),
(2) Date: Aug. 8, 2014

(87) PCT Pub. No.: WO2013/121830
PCT Pub. Date: Aug. 22, 2013

(65) Prior Publication Data
US 2016/0001661 A1    Jan. 7, 2016

(30) Foreign Application Priority Data
Feb. 15, 2012   (JP) .................................. 2012-030084

(51) Int. Cl.
*B60L 11/18*    (2006.01)
*H02M 3/158*    (2006.01)
(Continued)

(52) U.S. Cl.
CPC ............... *B60L 11/18* (2013.01); *H02M 1/08* (2013.01); *H02M 1/14* (2013.01); *H02M 1/44* (2013.01);
(Continued)

(58) Field of Classification Search
None
See application file for complete search history.

(56) References Cited

U.S. PATENT DOCUMENTS 4,587,604 A * 5/1986 Nerone ............... H02M 3/3376
307/82
2002/0158329 A1 * 10/2002 Kimura .................. H01G 4/228
257/703

(Continued)

FOREIGN PATENT DOCUMENTS

JP    H09-285110 A    10/1997
JP    10-056776      2/1998
(Continued)

OTHER PUBLICATIONS

PCT International Search Report on application PCT/JP2013/051028 mailed Apr. 23, 2013; 3 pages.
(Continued)

*Primary Examiner* — Jared Fureman
*Assistant Examiner* — Joel Barnett
(74) *Attorney, Agent, or Firm* — Foley & Lardner LLP

(57) ABSTRACT

Provided is an in-vehicle step-down switching power supply capable of obtaining a stable output while suppressing nose in a harmful frequency band even when an input voltage decreases. The in-vehicle step-down switching power supply includes a switching frequency control unit and the switching frequency control unit includes a switching frequency range setting unit that changes a switching frequency between fa and fb and a switching frequency path setting
(Continued)

unit that skips a frequency band from fd to fe between fa and fb, via an intermediate frequency fc between fa and fb.

7 Claims, 3 Drawing Sheets

(51) Int. Cl.
  *H02M 1/44* (2007.01)
  *H02M 3/156* (2006.01)
  *H02M 1/08* (2006.01)
  *H02M 1/14* (2006.01)
  *H02M 1/00* (2006.01)

(52) U.S. Cl.
  CPC ........... *H02M 3/156* (2013.01); *H02M 3/158* (2013.01); *H02M 2001/0006* (2013.01)

(56) References Cited

U.S. PATENT DOCUMENTS

| | | |
|---|---|---|
| 2010/0156527 A1 | 6/2010 | Midya et al. |
| 2012/0098510 A1* | 4/2012 | Galtie .................. H02M 3/156 323/282 |
| 2012/0293146 A1* | 11/2012 | Zhao ................ H02M 3/33507 323/282 |

FOREIGN PATENT DOCUMENTS

| | | |
|---|---|---|
| JP | 2002-037098 A | 2/2002 |
| JP | 2005-333726 A | 12/2005 |
| JP | 2007-318954 A | 12/2007 |
| JP | 2008-125341 A | 5/2008 |
| JP | 2011-135168 A | 7/2011 |
| WO | WO-2011/007207 A1 | 1/2011 |

OTHER PUBLICATIONS

European Office Action dated May 2, 2017 as received in corresponding European Patent Application No. 13748897.9.

\* cited by examiner

IN-VEHICLE STEP-DOWN SWITCHING POWER SUPPLY, IN-VEHICLE ELECTRONIC CONTROL DEVICE, AND IDLE STOP SYSTEM

TECHNICAL FIELD

The present invention relates to an in-vehicle step-down switching power supply, an in-vehicle electronic control device having the in-vehicle step-down switching power supply mounted thereto, and an idling stop system having the in-vehicle step-down switching power supply mounted thereto.

BACKGROUND ART

In a general in-vehicle step-down switching power supply, a step-down ratio is adjusted by controlling a duty (D: ratio ($D=T_{on}/T$) of a switching cycle (T) and an on-period ($T_{on}$)) of a PWM signal input to a gate of a main switch. Because D is determined by a ratio $V_{out}/V_{in}$ of an input voltage ($V_{in}$) and an output voltage ($V_{out}$), D approaches 100% when $V_{in}$ decreases and approaches $V_{out}$. However, because an on/off-period of a main switch element cannot be made to become zero, from a restriction of securing a gate driving voltage of the main switch by a bootstrap circuit or a minimum on/off transition duration of a switching element, there is a duty allowance range such as 5 to 95% in D. If D is more than a value in the allowance range, a switching power supply may not normally operate. In PTL 1, a method suggested as a method to solve the above problem is described. The method described in PTL 1 changes a switching frequency (F–sw) of a MOSFET according to a voltage generated in the bootstrap circuit to generate a gate driving voltage of the MOSFET, thereby stably driving a switch element.

CITATION LIST

Patent Literature

PTL 1: JP 10-56776 A

SUMMARY OF INVENTION

Technical Problem

In an in-vehicle electronic apparatus, the regulation of electromagnetic noise is established to prevent an erroneous operation of other electronic apparatus from being caused by the electromagnetic noise generated by the apparatus or auditory noise from being generated when the electromagnetic noise is input to a radio receiving antenna. In this regulation, a regulation level higher than that of other frequency band (FB-rest) is established in a frequency band (FB-com) used for a communication and a radio.

As in PTL 1, when F–sw is controlled in proportion to a bootstrap voltage, F–sw may take all frequencies that are equal to or lower than a switching frequency (F–sw1) at the time of stationary driving. That is, when F–sw1 is set to FB-rest existing in a frequency band higher than a certain communication frequency band FB-com1, F–sw takes a frequency of FB-com1 according to a decrease in the bootstrap voltage. For this reason, the regulation of the electromagnetic noise may not be achieved.

In addition, because a load such as a microcomputer driven at a low voltage is connected to an output of the step-down power supply, a stable output voltage is required. As a main factor of an output voltage variation of the step-down power supply, a voltage ripple ($\Delta V_{out}$) caused by a current ripple of a main coil is exemplified. $\Delta V_{out}$ is a value determined using F–sw and $V_{in}$ as variables. For this reason, if F–sw is not controlled by considering $V_{in}$, $\Delta V_{out}$ becomes excessive and an output becomes unstable. As in PTL 1, in the method to control F–sw by monitoring the bootstrap voltage, it is difficult to obtain a stable output at all times. As measures to obtain the stable output by decreasing $\Delta V_{out}$, a method to increase inductance of the main coil and a method to decrease equivalent series resistance (ESR) of an output capacitor are considered. However, these methods increase a mounting area or a cost.

The present invention has been made to solve the above-described problems and an object of the present invention is to suppress noise of frequencies harmful to a communication while suppressing a capacity of a coil or a capacitor and obtain a stable output, even when an input voltage $V_{in}$ supplied from an in-vehicle power supply such as a battery decreases, that is, a duty is high, in an in-vehicle step-down power supply.

Solution to Problem

In order to solve the above-described problem, an in-vehicle step-down switching power supply of the present invention includes a first switch element which switches conduction and non-conduction to an output side of an input voltage, a switching frequency control circuit which outputs a switching frequency at which the first switch element executes a switching operation, and a rectification unit which executes a rectification operation to generate a circulation current by a path of the output side when the first switch element is non-conductive, wherein the switching frequency control circuit includes a switching frequency range setting unit which changes the switching frequency between fa and fb lower than fa and a switching frequency path setting unit which changes the switching frequency according to the input voltage and performs setting to skip a frequency band from fd to fe between fa and fb, via a frequency fc between fa and fb.

Advantageous Effects of Invention

According to the present invention, even when an input voltage decreases, a stable step-down switching operation is enabled and electromagnetic noise can be suppressed.

DESCRIPTION OF EMBODIMENTS

In an in-vehicle step-down switching power supply, electromagnetic noise caused by a voltage ripple generated between a positive electrode and a negative electrode of an input side is generated by an operation thereof. A noise spectrum that is observed by a measurement apparatus such as a spectrum analyzer has the maximum noise strength at a switching frequency (F-sw).

In an in-vehicle electronic apparatus, the regulation of the electromagnetic noise is established to prevent an erroneous operation of other electronic apparatus from being caused by the electromagnetic noise generated by the apparatus or auditory noise from being generated when the electromagnetic noise is input to a radio receiving antenna. In this regulation, a regulation level higher than that of other frequency band (FB-rest) is established in a frequency band (FB-com) used for a communication and a radio.

As in the related art, when F-sw is controlled in proportion to a bootstrap voltage, F-sw may take all frequencies that are equal to or lower than a switching frequency (F-sw1) at the time of stationary driving. That is, when F-sw1 is set to FB-rest existing in a frequency band higher than a certain communication frequency band FB-com1, F-sw takes a frequency of FB-com1 according to a decrease in the bootstrap voltage. For this reason, the regulation of the electromagnetic noise may not be achieved. As a simple measure, a method to increase a capacity of an input-side capacitor is taken. However, this method increases a mounting area or a cost.

In addition, because a load such as a microcomputer driven at a low voltage is connected to an output of a step-down power supply, a stable output voltage is required. As a main factor of an output voltage variation of the step-down power supply, a voltage ripple ($\Delta V_{out}$) caused by a current ripple of a main coil is exemplified. $\Delta V_{out}$ is a value determined using F-sw and $V_{in}$ as variables. For this reason, if F-sw is not controlled by considering $V_{in}$, $\Delta V_{out}$ becomes excessive and an output becomes unstable. As in PTL 1, in the method to control F-sw by monitoring the bootstrap voltage, it is difficult to obtain a stable output at all times. As measures to obtain the stable output by decreasing $\Delta V_{out}$, a method to increase inductance of the main coil and a method to decrease equivalent series resistance (ESR) of an output capacitor are considered. However, these methods increase a mounting area or a cost.

Hereinafter, embodiments of the present invention to solve the above-described problems will be described using the drawings.

[First Embodiment]

Figure 1:
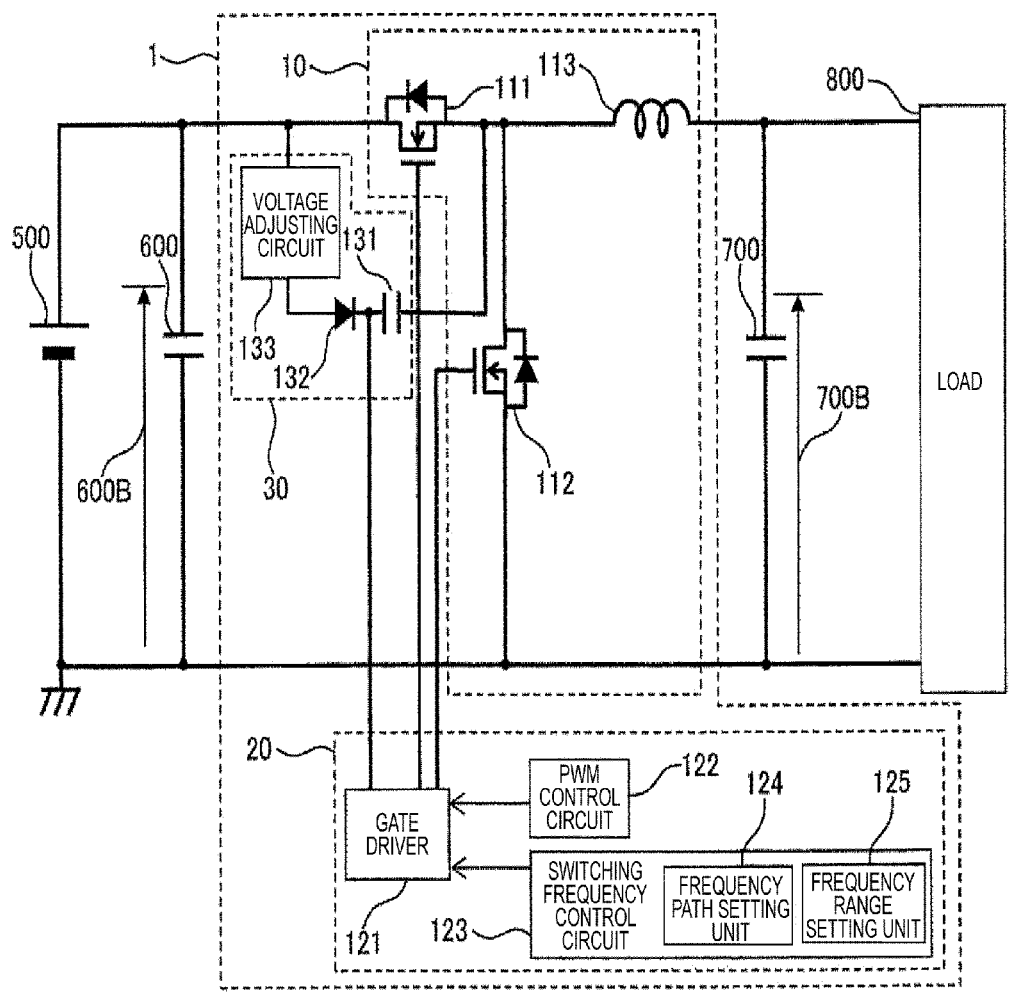
FIG. 1 is a diagram illustrating an in-vehicle step-down switching device according to a first embodiment.

Hereinafter, a first embodiment of an in-vehicle step-down switching power supply according to the present invention will be described in detail using FIGS. 1 and 2. FIG. 1 illustrates a structural view of a power supply circuit of an in-vehicle control device including the in-vehicle step-down switching power supply according to the first embodiment.

The in-vehicle control device is connected to a battery 500 to be an in-vehicle power supply and includes an input-side capacitor 600, a step-down switching power supply circuit 1, an output-side capacitor 700, and a load 800. The step-down switching power supply circuit 1 includes a main circuit unit 10, a control circuit unit 20, and a bootstrap circuit unit 30.

The main circuit unit 10 includes an n channel type MOSFET 111 to be a main switch, an N channel type MOSFET 112 for synchronous rectification, and a main coil 113 for output voltage smoothing. The MOSFET 111 and the MOSFET 112 are switched by a gate driving signal of the control circuit unit 20, execute a step-down operation, and step down a voltage from a voltage 600B of the input-side capacitor 600 to a voltage 700B of the output-side capacitor 700. When the MOSFET 111 is turned on, the input side and the output side become conductive. When the MOSFET 111 is turned off, the input side and the output side become non-conductive and a circulation current is generated by a closed circuit including the main coil 113, the output-side capacitor 700, and the MOSFET 112. By controlling an on-period and an off-period of the MOSFET 111, an output voltage is controlled.

The MOSFET 112 executes a switching operation in synchronization with the MOSFET 111. The MOSFET 112 is controlled to be turned off when the MOSFET 111 is turned on and is controlled to be turned on when the MOSFET 111 is turned off. Instead of the MOSFET 112, a diode element functioning as a switch passively synchronizing with the MOSTEF 111 and having an anode terminal connected to a load of the input-side capacitor 600 may be provided as a rectification unit. However, efficiency of the MOSFET 112 for the synchronous rectification is superior because on-resistance of the MOSFET 112 is lower than on-resistance of the diode element.

The control circuit unit 20 includes a gate driver 121, a PWM control circuit 122, and a switching frequency control circuit 123. The PWM control circuit 122 outputs a duty D of a PWM signal input to a gate of the MOSFET 111 according to a step-down ratio (700B/600B) to the gate driver 121. The switching frequency control circuit 123 includes a frequency range setting unit 125 and a frequency path setting unit 124 and outputs a switching frequency F-sw according to the input voltage 600B to the gate driver 121. The gate driver 121 outputs gate driving signals of the MOSFET 111 and the MOSFET 112, on the basis of the input duty D and switching frequency F-sw. When the MOSFET 111 is turned on, it is necessary to input a gate voltage higher than a gate voltage threshold Vth of the MOSFET 111 with respect to a source voltage. For this reason, a voltage is supplied from the bootstrap circuit unit 30. Here, the frequency range setting unit 125 and the frequency path setting unit 124 are setting units that are configured by a microcomputer and a logic circuit or an analog circuit.

The bootstrap circuit unit 30 includes a capacitor 131 of which one end is connected to a source terminal of the MOSFET 111, a voltage adjusting circuit 133 of which an input end is connected to a positive electrode of the input-side capacitor 600, and a diode 132 of which an anode is connected to an output end of the voltage adjusting circuit and a cathode is connected to the other end of the capacitor 131 and an end of the cathode side of the diode 132 is connected to the gate driver. A charge of the capacitor 131 is supplied to the gate driver 121 using a source-GND voltage varied by switching of the MOSFET 111.

Figure 2:
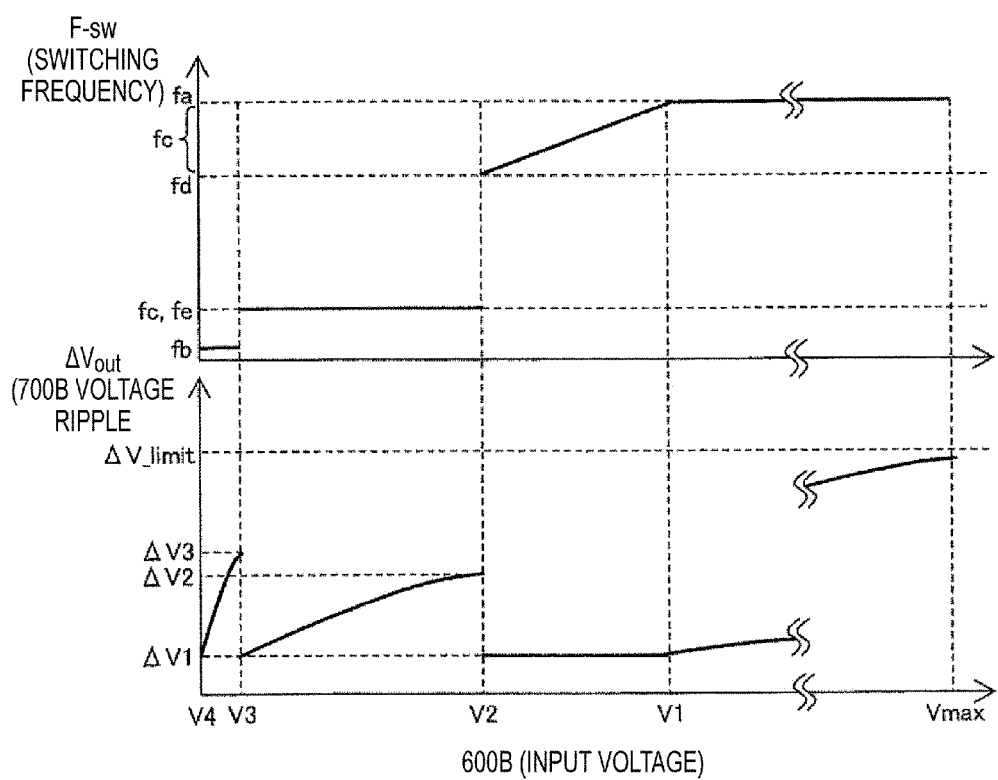
FIG. 2 is a diagram illustrating input voltage dependency of a switching frequency and an output voltage ripple according to the first embodiment.

Hereinafter, an operation according to the first embodiment will be described using a switching frequency F-sw and $\Delta V_{out}$ (a voltage ripple of 700B) with respect to the input voltage 600B (input voltage), which are illustrated in FIG. 2. The frequency range setting unit previously sets a range of F-sw to fa to fb. In addition, the frequency path setting unit fixes the switching frequency to fa in a range of the input voltage 600B of V1 or more, sets the switching frequency to fc, such that the voltage ripple $\Delta V_{out}$ of the output voltage 700B holds a voltage ripple $\Delta V1$, in a range of V1 to V2. The frequency path setting unit sets the switching frequency to fe in a range of V2 to V3, and sets the switching frequency to fb in a range of V3 to V4. In addition, a frequency band of fd to fe is set to be skipped in consideration of an influence of noise generated from the input side to the outside, particularly, an influence of noise in a frequency band used for a radio or a communication.

When the input voltage 600B of FIG. 2 is in a range of the upper limit Vmax of the input voltage to V1, F-sw is fixed to fa. Here, a circuit constant is adjusted such that $\Delta V_{out}$ becomes lower than an allowance upper limit $\Delta V\_limit$ of an output ripple determined by a request of the load side, even when the input voltage 600B is the upper limit Vmax of the input voltage, at F-sw=fa. When the input voltage 600B decreases, the current ripple of the main coil 113 decreases and the voltage ripple $\Delta V_{out}$ of the output voltage 700B decreases. In a region in which the input voltage 600B is V1 or less, F-sw is adjusted to an intermediate frequency fc of fa and fb such that the output voltage ripple becomes $\Delta V1$. In the region in which the input voltage 600B is V1 or less, when the input voltage 600B decreases, fc decreases. When the input voltage 600B is V2, F-sw is fc and when the input voltage 600B is less than V2, F-sw changes to fe at a time. At this time, $\Delta V_{out}$ increases (fd/fe) times from $\Delta V1$ and becomes $\Delta V2$. However, $\Delta V_{out}$ is adjusted not to be more than $\Delta V\_limit$. In the range of V2 to V3, at fc=fe, when the input voltage 600B becomes less than V3, F-sw changes to fb. Here, fb is set to a cycle sufficiently shorter than a constant at the time of discharging of the capacitor 131 of the bootstrap circuit. Thereby, the frequency can be set without considering a decrease in the bootstrap voltage. The frequency control method when the voltage decreases has been described. However, even when the input voltage 600B increases, the switching frequency is also set by the input voltage 600B.

Hereinafter, a setting example of the case in which the output voltage allowance ripple $\Delta V\_limit$ is set to 20 [mV], the constant at the time of discharging of the capacitor 131 of the bootstrap circuit is set to 0.1 [s], the input-side voltage is set to 600B=6 to 18 [V], the output voltage is set to 700B=6 [V], fa is set to 460 kHz, a minimum off time Toff_min of the main MOSFET 111 is set to 250 [ns], the main coil inductance L113 is set to 20 [uH], and the equivalent series resistance ESR700 of the output-side capacitor 700 is set to 40 [mΩ], on the assumption that the frequency band used for the radio or the communication is 100 k to 300 kHz, is illustrated.

fb is set to a value capable of securing the off time $T_{off}$ necessary for the stable switching operation. When fb decreases, the duty allowance range can be widened. However, because it is necessary to set fb to the cycle sufficiently shorter than the constant at the time of discharging of the capacitor 131, fb is set to 40 [us], that is, 25 [kHz] in this embodiment. fd and fe are set to fd=300 [kHz] and fe=100 [kHz], respectively, to skip the frequency band used for the radio or the communication. Values of fd and fe may be appropriately changed according to a frequency band of the noise regulation.

Here, a calculation expression (expression 1) of the output voltage ripple $\Delta V_{out}$ and a calculation expression (expression 2) of the main FET off-period $T_{off}$ can be represented as follows. In (Formula 1), a voltage variation component ($\Delta V=\Delta Q/C$) by a charging/discharging charge to the capacity of the output-side capacitor 700 is ignored as a small value. However, the voltage variation component may be considered according to necessity.

[Mathematical Formula 1]

$$\Delta V_{out} = \frac{V_{in} - V_{out}}{L_{coil} \cdot F_{sw}} \cdot \frac{V_{out}}{V_{in}} \cdot R_{Cout} \quad \text{(Formula 1)}$$

[Mathematical Formula 2]

$$T_{off} = \frac{1}{F_{sw}} \cdot \left(1 - \frac{V_{out}}{V_{in}}\right) \quad \text{(Formula 2)}$$

$\Delta V_{out}$: output voltage ripple
$L_{coil}$: inductance of main coil (corresponding to L113)
$F_{sw}$: switching frequency (corresponding to F-sw)
$V_{in}$: input voltage (corresponding to 600B)
$V_{out}$: output voltage (corresponding to 700B)
$R_{Cout}$: equivalent series resistance of output-side capacitor (corresponding to ESR700)

According to (Formula 1), when $V_{in}$ approaches $V_{out}$, $\Delta V_{out}$ decreases and $\Delta V_{out}$ is inversely proportional to F-sw. For example, if F-sw is set to 1/10 at the same input voltage 600B, $\Delta V_{out}$ increases ten times. That is, t is known that F-sw control according to $V_{in}$ is necessary to satisfy $\Delta V_{out} < \Delta V\_limit$.

If conditions to satisfy $T_{off} > 250$ [ns] and $\Delta V_{out} < 20$ [mV] are acquired according to (Formula 1) and (Formula 2), the conditions are as follows.

If F-sw=fa=460 [kHz] is set, V1 is determined as V1=6.8 [V]. If f-sw=fd=300 [kHz] is set, V2 is determined as V2=6.5 [V]. fc is set to a transformation expression of (Formula 2): fc=(1/Toff_min)×(1−(700B/600B)). Thereby, $T_{off}$ and $\Delta V_{out}$ can be constantly maintained. If F-sw=fe=100 [kHz] is set, V3 is determined as 6.16 [V]. If F-sw=fb=25 [kHz] is set, V4 is determined as 6.04 [V].

If $\Delta V_{out}$ and $T_{off}$ are collected, these are as follows and can satisfy $T_{off} > 50$ [ns] and $\Delta V_{out} < 20$ [mV].

In the case of 600B=Vmax=18 [V] and F-sw=460 [kHz], $\Delta V_{out}$=17.5 [mV] and $T_{off}$=1.45 [us] are satisfied.

In the case of 600B=V1=6.8 [V] and F-sw=460 [kHz], $\Delta V_{out}=\Delta V1$=3.1 [mV] and $T_{off}$=256 [ns] are satisfied.

In the case of 600B=V2=6.5 [V] and F-sw=300 [kHz], $\Delta V_{out}=\Delta V1$=3.1 [mV] and $T_{off}$ 256 [ns] are satisfied.

In the case of 600B=V2=6.5 [V] and F-sw=100 [kHz], $\Delta V_{out}=\Delta V2$=9.3 [mV] and $T_{off}$=770 [ns] are satisfied.

In the case of 600B=V3=6.16 [V] and F-sw=100 [kHz], $\Delta V_{out}=\Delta V1$=3.1 [mV] and $T_{off}$=260 [ns] are satisfied.

In the case of 600B=V3=6.16 [V] and F-sw=25 [kHz], $\Delta V_{out}=\Delta V3$=12.5 [mV] and $T_{off}$=1.04 [us] are satisfied.

In the case of 600B=V4=6.04 [V] and F-sw=25 [kHz], $\Delta V_{out}=\Delta V1$=3.2 [mV] and $T_{off}$=265 [ns] are satisfied.

Here, if F-sw changes from fa (460 [kHz]) to fb (25 kHz) at 600B=V1=6.8 [V] becoming $T_{off} \rightarrow$Toff_min at F-sw=fa, $\Delta V_{out}$ becomes 3.1 [mV]×(460 [kHz]/25 [kHz])=57 [mV] and is more than $\Delta V\_limit$. For this reason, it is necessary to change the frequency via an intermediate frequency fc.

In addition, in the above example, F-sw changes from fa to fb. However, even when F-sw changes from fe (100 [kHz]) to be a lower limit of a prohibition frequency band to fb (25 kHz), it is preferable to change the frequency via the intermediate frequency fc to suppress an output voltage ripple. That is, fc means any frequency in a range in which frequencies of fd to fe to be a noise regulation frequency band are skipped, in the frequency band of fa to fb. In this embodiment, fc changes to decrease when the input voltage 600B decreases in the range.

As described above, according to this embodiment, a stable output voltage can be obtained while noise in a frequency band harmful to the communication is suppressed. That is, if the input voltage $V_{in}$ decreases, the duty D of the PWM signal input to the gate of the main switch according to the step-down ratio increases and the off-period $T_{off}$ of the main switch becomes short. However, according to this embodiment, the switching frequency can be decreased to the frequency fb capable of securing $T_{off}$ necessary for the stable switching operation while suppressing the output voltage ripple and the noise.

In this embodiment, the switching frequency setting method depending on the input voltage has been described. However, because a relation of the input voltage 600B and $T_{off}$ is represented by (Formula 2) described above, the switching frequency may be set by $T_{off}$. In addition, in this embodiment, conduction resistance or parasitic inductance of an element, a current superimposing characteristic or a control variation of a coil, and a spread of a noise spectrum are ignored to simplify the description. However, a margin having considered these factors may be set. In addition, in this embodiment, a fundamental wave component of a switching frequency having the largest noise strength has been considered. However, because a harmonic component of second order or more may cause a problem according to a shape of a ripple voltage waveform of the input side, setting having considered the harmonic component may be performed according to a situation. Thereby, the same effects as the first embodiment can be obtained.

In addition, in the in-vehicle step-down switching power supply according to this embodiment, a part of components including semiconductor components may be embedded in an integrated circuit such as a custom IC.

The in-vehicle step-down switching power supply according to this embodiment may be used independently as a power supply device and may be mounted to an in-vehicle electronic control device such as an engine control unit (ECU) and an automatic transmission control unit (ATCU). In addition, the in-vehicle step-down switching power supply according to this embodiment may be mounted to an electronic control device of an idle stop system that stops an engine, when a vehicle stops.

As described above, according to this embodiment, the following effects can be obtained.

An input-side noise filter including an input-side capacitor can be miniaturized. In addition, a filter including an output-side capacitor can be miniaturized.

In the idle stop system, even in a state in which an engine and an alternator stop at the time of the idle stop and a battery voltage decreases, the radio operates. However, according to this embodiment, even when the input voltage decreases, a variation of an output voltage is suppressed and noise of a harmful frequency is suppressed. Therefore, a stable output is obtained at the time of the idle stop and radio noise is suppressed.

[Second Embodiment]

Figure 3:
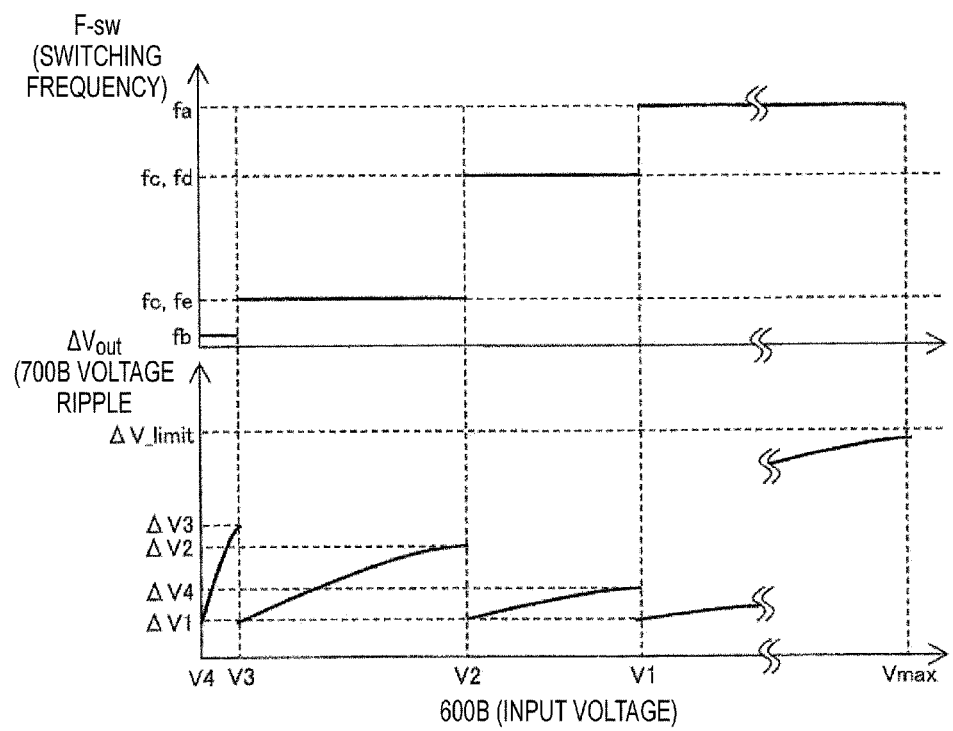
FIG. 3 is a diagram illustrating input voltage dependency of a switching frequency and an output voltage ripple according to a second embodiment.

Hereinafter, a first embodiment of the in-vehicle step-down switching power supply according to the present invention will be described in detail using FIGS. 1 and 3. FIG. 3 is a diagram corresponding to FIG. 2 in the first embodiment. The same portions as the first embodiment are denoted with the same reference numerals and explanation thereof is omitted. Hereinafter, different portions will be described.

FIG. 3 is different from FIG. 2 in setting of fc in a range of V2 to V1. In the range of V2 to V1, fc is set as fc=fd to a constant value, so that $\Delta V_{out}$ when an input voltage 600B changes from V1 to less than V1 becomes $\Delta V4$. At this time, $\Delta V_{out}$ and $T_{off}$ can satisfy $T_{off}>250$ [ns] and $\Delta V_{out}<20$ [mV] as follows.

In the case of 600B=V1=6.8 [V] and F-sw=460 [kHz], $\Delta V_{out}=\Delta V1=3.1$ [mV] and $T_{off}=256$ [ns] are satisfied.

In the case of 600B=V1=6.8 [V] and F-sw=300 [kHz], $\Delta V_{out}=\Delta V4=4.7$ [mV] and $T_{off}=390$ [ns] are satisfied.

In addition, even when the frequency decreases from the lower limit fe of the noise regulation frequency band to fb, the frequency may be set via the intermediate frequency fc. At this time, fc is set to a constant value between fe and fb.

According to the second embodiment, a logic circuit of a frequency path setting unit can be simplified and an in-vehicle step-down switching power supply that has a small size and a low cost can be provided.

[Third Embodiment]

Hereinafter, a third embodiment of the in-vehicle power supply device according to the present invention will be described in detail using FIG. 4. In general, an electrolytic capacitor includes an explosion-proof valve to prevent the explosion at the time of the temperature rise. In the case of amounting form of resin sealing, the explosion-proof valve is blocked and it is difficult to secure safety. For this reason, the electrolytic capacitor cannot be used.

According to the first and second embodiments, because the capacities of the input-side capacitor and the output-side capacitor can be decreased, the electrolytic capacitor used in the related art can be replaced with a ceramic capacitor. For this reason, mounting of the form of the resin sealing is enabled. If the resin sealing is enabled, semiconductor components can be subjected to bare chip mounting and miniaturization is enabled.

Figure 4:
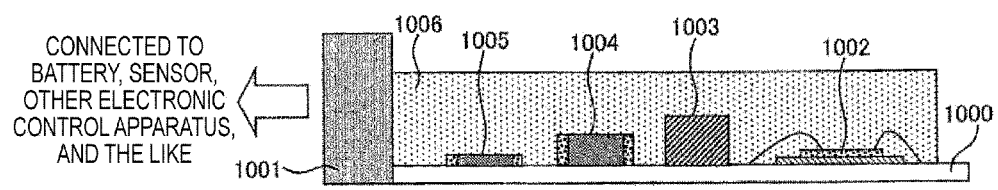
FIG. 4 is a diagram illustrating a mounting structure according to a third embodiment.

FIG. 4 illustrates the case in which the step-down switching power supply according to the first and second embodiments are sealed by the resin. A semiconductor component 1002, a surface mounting inductor 1003, a ceramic capacitor 1004, a chip resistor 1005, and a connector 1001 are mounted to a metal base substrate 1000 in which a wiring pattern is formed and the resultant is sealed by a resin 1006. The step-down switching power supply is connected to a battery, a sensor, other electronic control apparatus, and the like through a connector 1001.

In FIG. 4, each of the resistive elements, the capacitor components, the inductor components, and the semiconductor components among the individual circuit components described in the first to third embodiments is illustrated only one by one. However, in actuality, a plurality of components may be mounted. In addition, if the ceramic capacitor 1004 is a capacitor in which the explosion-proof valve is not necessary, the ceramic capacitor may be replaced. The metal base substrate 1000 may be a substrate such as a ceramic substrate and a multilayer printed wiring board, a printed circuit board in which bending is enabled, or a flexible substrate.

By adopting the mounting structure described above, an in-vehicle step-down switching power supply and an in-vehicle electronic control device that have a small size can be provided.

Effects according to the present invention are as follows.

(1) A stable step-down switching operation is enabled even when an input voltage decreases.

(2) Electromagnetic noise of a harmful frequency can be suppressed even when an input voltage decreases.

(3) A filter structure such as an input-side capacitor can be miniaturized.

(4) A filter structure such as an output-side capacitor can be miniaturized.

(5) A stable step-down switching operation is enabled even at the time of an idle stop.

(6) Electromagnetic noise can be suppressed even at the time of an idle stop.

(7) An in-vehicle electronic control device can be miniaturized by removing an electrolytic capacitor.

(8) An in-vehicle step-down switching power supply and an in-vehicle electronic control device can be miniaturized by resin sealing and mounting.

REFERENCE SIGNS LIST 1 step-down switching power supply circuit
10 main circuit unit
20 control circuit unit
30 bootstrap circuit unit
111, 112 MOSFET
113 main coil
121 gate driver
122 PWM control circuit
123 switching frequency control circuit
124 frequency path setting unit
125 frequency range setting unit
500 battery
600 input-side capacitor
600B input voltage
700 output-side capacitor
800 load
1000 metal base substrate
1001 connector
1002 semiconductor component
1003 surface mounting inductor
1004 ceramic capacitor
1005 chip resistor

The invention claimed is:

1. An in-vehicle step-down switching power supply including a first switch element configured to switch conduction and non-conduction to an output side of an input voltage, a switching frequency control circuit configured to output a switching frequency at which the first switch element executes a switching operation, and a rectification unit configured to execute a rectification operation which generates a circulation current by a path of the output side when the first switch element is non-conductive, wherein the switching frequency control circuit includes a switching frequency range setting unit configured to set a switching frequency range to be between fa and fb, fb being a lower frequency than fa, and a switching frequency path setting unit configured to set the switching frequency to a switching frequency within the switching frequency range according to the input voltage, wherein the switching frequency path setting unit is configured to set the switching frequency to fa when the input voltage is equal to or more than a preset threshold, and is configured to set the switching frequency to fc when the input voltage is equal to or less than the threshold, and fc decreases according to a decrease in the input voltage, and is between fa and fb, and the switching frequency path setting unit is configured to set the decreasing frequency fc to skip a frequency band between frequencies fd to fe when decreasing fc according to the decrease in input voltage, fd and fe being within the switching frequency range.

2. The in-vehicle step-down switching power supply according to claim 1, wherein the switching frequency path setting unit sets fc to a constant value when the input voltage is below a threshold voltage, after having been decreased between fa and fd.

3. The in-vehicle step-down switching power supply according to claim 1, further comprising:

a main coil; and the first switch element which causes an excitation current to flow through the main coil during an on-period $T_{on}$, wherein the switching frequency control unit sets the switching frequency according to a period $T_{off}$ during which the first switch element is turned off.

4. The in-vehicle step-down switching power supply according to claim 1, wherein at least one of the circuits of the in-vehicle step-down switching power supply is embedded in a semiconductor integrated circuit.

5. An in-vehicle electronic control device comprising the in-vehicle step-down switching power supply according to claim 1.

6. The in-vehicle electronic control device according to claim 5, wherein a ceramic capacitor is provided in each of the input side and the output side of the in-vehicle step-down switching power supply and at least one of the components of the in-vehicle step-down switching power supply are sealed by a resin.

7. An idle stop system comprising the in-vehicle electronic control device according to claim 5.

* * * * *